United States Patent [19]
Koyama et al.

[11] Patent Number: 5,168,409
[45] Date of Patent: Dec. 1, 1992

[54] INTEGRATED MAGNETIC HEAD HAVING A MAGNETIC LAYER FUNCTIONING AS BOTH A MAGNETIC SHIELD AND A MAGNETIC POLE

[75] Inventors: Naoki Koyama, Kokubunji; Hisashi Takano; Eijin Moriwaki, both of Hachioji; Kazuo Shiiki, Tsukui, all of Japan

[73] Assignee: Hitachi, Ltd., Tokyo, Japan

[21] Appl. No.: 476,787

[22] Filed: Feb. 8, 1990

[30] Foreign Application Priority Data

Feb. 8, 1989 [JP] Japan .................................. 1-27415

[51] Int. Cl.⁵ .......................... G11B 5/127; G11B 5/33
[52] U.S. Cl. ...................................... 360/113; 360/122
[58] Field of Search ................ 360/113, 122, 126–127, 360/110, 119

[56] References Cited

U.S. PATENT DOCUMENTS

| | | | |
|---|---|---|---|
| 4,291,351 | 9/1981 | Pennell et al. | 360/113 |
| 4,458,279 | 7/1984 | Katz | 360/113 |
| 4,566,050 | 1/1986 | Beam et al. | 360/113 |
| 4,668,913 | 5/1987 | Vinal | 360/113 |
| 4,797,766 | 1/1989 | Enz | 360/113 |
| 4,843,505 | 6/1989 | Mowry | 360/113 |
| 4,885,649 | 12/1989 | Das | 360/113 |
| 4,907,113 | 3/1990 | Mallary | 360/113 |
| 4,907,115 | 3/1990 | Ruigrok et al. | 360/113 |
| 5,005,096 | 4/1991 | Krounbi et al. | 360/113 |

FOREIGN PATENT DOCUMENTS

| | | | |
|---|---|---|---|
| 59-35088 | 3/1984 | Japan . | |
| 59-177715 | 10/1984 | Japan | 360/113 |
| 1296417 | 11/1989 | Japan | 360/113 |

Primary Examiner—Aristotelis Psitos
Assistant Examiner—Alfonso Garcia
Attorney, Agent, or Firm—Fay, Sharpe, Beall, Fagan, Minnich & McKee

[57] ABSTRACT

The magnetic layer of a head structure can satisfy the characteristics of both the magnetic shield layer and magnetic pole layer for recording by bringing the combined upper part and lower part of the magnetic layer respectively into conformity with the widths necessary for the shield layer and for the magnetic pole, e.g., specifically, by disposing a taper or more specifically a step shape to the section of the magnetic layer to have the dimension of the upper part of the magnetic layer different from that of the lower part. The width of the magnetic layer facing one of the recording magnetic poles can be brought into conformity with the track width. Accordingly, the flux at the time of a write operation concentrates on the track width portion and hence, side writing of the recording head can be reduced. On the other hand, the width of the magnetic head on the opposed side to the magnetoresistive sensor can be extended sufficiently to fully cover the sensor. For this reason, the noise picked up by the magnetoresistive sensor resulting from the signal flux from the adjacent tracks can be reduced.

32 Claims, 3 Drawing Sheets

←— TRACK WIDTH —→

←— TRACK WIDTH —→

←— TRACK WIDTH —→

INTEGRATED MAGNETIC HEAD HAVING A MAGNETIC LAYER FUNCTIONING AS BOTH A MAGNETIC SHIELD AND A MAGNETIC POLE

BACKGROUND OF THE INVENTION

This invention relates to an integrated magnetic head suitable for high density recording.

Studies have been made on an integrated magnetic head which separates a recording head and a reproduction head, to accomplish high performance and to improve magnetic recording density. Recording inductive type and reproducing magnetoresistive type heads are made composite. In such a head, one, or both, of the magnetic shield layers are used also as the magnetic pole of the inductive head, as disclosed in a large number of references, such as Japanese Patent Publication No. 35088/1984.

SUMMARY

When the magnetic shield layer serves also as the magnetic pole of the recording head, its dimension in the direction of track width becomes a problem. Generally, the length of the magnetoresistive sensor must be greater than its track width in order to provide anisotropy in the track width direction. In this case, the magnetic shield layer must cover fully the magnetoresistive sensor as a whole in order to suppress the noise that occurs at portions other than the track width. On the other hand, the dimension of the magnetic pole for recording must be in conformity with the track width. In this manner, as to the dimension of the magnetic layer in the track width direction, the conventional heads cannot satisfy simultaneously these two requirements. As a countermeasure, in the separated type head in which the recording head is laminated on the magnetoresistive sensor, a structure is known wherein an upper pole is brought into conformity with the track width while a lower pole has a length such that it can cover the magnetoresistive sensor as a whole. However, the track width of the upper pole does not coincide with that of the lower recording pole, so that side writing is likely to occur at the end portions of the magnetic poles and excellent recording characteristics cannot be obtained easily.

The present invention provides a magnetic layer of a head structure which can satisfy the characteristics of both the magnetic shield layer and magnetic pole layer for recording.

The problems described above can be solved by bringing the combined upper part and lower part of the magnetic layer respectively into conformity with the widths necessary for the shield layer and for the magnetic pole, e.g., specifically, by disposing a taper, or more specifically a step shape, to the section of the magnetic layer to have the dimension of the upper part of the magnetic layer different from that of the lower part. Therefore, in the structure described above, the width of the magnetic layer facing one of the recording magnetic poles can be brought into conformity with the track width. Accordingly, the flux at the time of a write operation concentrates on the track width portion and hence, side writing of the recording head can be reduced. On the other hand, the width of the magnetic head on the opposed side to the magnetoresistive sensor can be extended sufficiently to fully cover the sensor. For this reason, the noise picked up by the magnetoresistive sensor resulting from the signal flux from the adjacent tracks can be reduced.

BRIEF DESCRIPTION OF THE DRAWINGS

Further objects, features and advantages of the present invention will become more clear from the following detailed description of a preferred embodiment, shown in the drawing, wherein.

DETAILED DESCRIPTION OF THE PREFERRED EMBODIMENT

Hereinafter, one embodiment of the present invention will be described with reference to FIGS. 1(a) and (b).

Figure 1A:
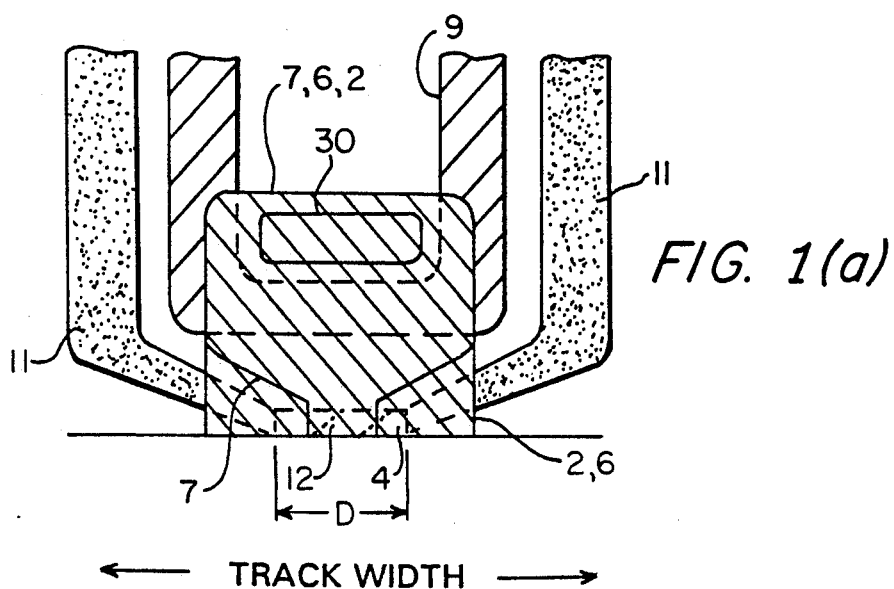
FIG. 1(a) is a plan view and FIG. 1(b) is an end view of a magnetic head for one embodiment of the present invention.
Figure 1B:
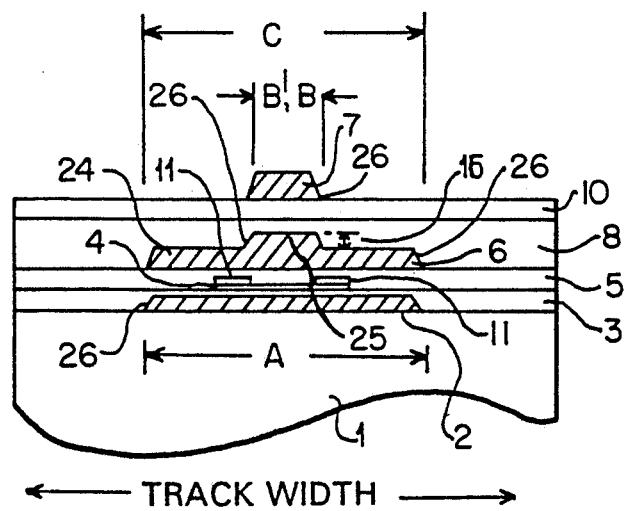

FIG. 1(a) is a plan view of the magnetic head in accordance with the present invention and FIG. 1(b) is a sectional or end view from the surface of a recording magnetic medium. A lower magnetic shield layer 2 is laminated on a head substate 1 and thereafter covered by an insulating layer 3. A magnetoresistive sensor 4 is laminated on the insulating layer 3, and electrode layers 11 are laminated on the sensor 4 and thereafter covered by an insulating layer 5. Subsequently, an upper magnetic shield layer 6 is laminated on the insulating layer 5 and thereafter covered by an insulating layer 8. Furthermore, a conductor layer 9, which is to serve as a coil, is laminated on the insulating layer 8 and thereafter covered with an insulating layer 10. Then an upper magnetic pole 7 is laminated on the insulating layer 10. Width is measured in the track width direction, that is horizontally in FIG. 1(b). The width dimension at the lower part 24 of the upper magnetic shield layer 6 is equal to the width dimension of the lower magnetic shield layer 2, and the width dimension at the upper part 25 of the upper magnetic shield layer 6 is equal to the width dimension of the upper magnetic pole.

The shield layers 2, 6 and the magnetic pole layer 7 are sputtered permalloy in a composition of 82Ni-18Fe, whose film thickness is 2.0 $\mu$m. The width dimensions on the end surface facing the medium are 100 $\mu$m for the lower shield layer 2, 90 $\mu$m at the lower part of the upper shield layer 6 serving also as the lower magnetic pole, 10 $\mu$m at the upper part of the upper shield layer 6, and 8 $\mu$m at the upper magnetic pole 7. The height of the step 16, as measured perpendicular to the width in FIG. 1(b), that is vertically, of the upper part of the two-stage lower magnetic pole 6 is 0.7 $\mu$m. The step can be considered the transition from the lower part 24 to the upper part 25. To provide each layer with lamination margin, the dimension of each layer becomes progressively smaller towards its upper part. Alumina is used for all the insulating layers 3, 5, 8 and 10. The film thickness, measured vertically in FIG. 1(b), at the portions interposed between the magnetic poles 2, 6, 7 is 0.3 $\mu$m, 0.4 $\mu$m, 0.7 $\mu$m and 0.7 $\mu$m for the insulating layers 3, 5, 8 and 10, respectively. These insulating layers 3, 5, 8, 10 are made flat by an etch-back method which is employed ordinarily. A 2.0 $\mu$m-thick copper film is used for the conductor layer 9 to form a one-turn coil. A 40 nm-thick permalloy composition 82Ni-18Fe film is formed by vacuum deposition for the magnetoresistive sensor 4 and it is 50 μm long (horizontally in FIG. 1(b)) in the track width direction and 10 μm high (vertically in FIG. 1(b)). Electrode layers 11 are disposed at both ends of this sensor and use a two-layered film of Ti of 60 nm-thickness and Au of 150 nm thickness.

A barberpole bias method is employed for the magnetoresistive sensor. Therefore, the end portion of each electrode 11 at the magnetosensitive portion 12 is inclined at 45° as seen in dotted lines in FIG. 1(a). The electrode spacing in the track width direction D is 6 μm and this spacing corresponds to an effective track width. The step due to the magnetoresistive sensor 4 is up to 0.3 μm and this value is smaller than the film thickness of the magnetic shield layer 6 to be formed thereon, that is 2.0 μm. The step on the magnetic pole (0.7 μm) is smaller than the thickness (2 μm) of the coil conductor 9. Accordingly, flattening of the insulator layers is not always necessary.

Figure 2:
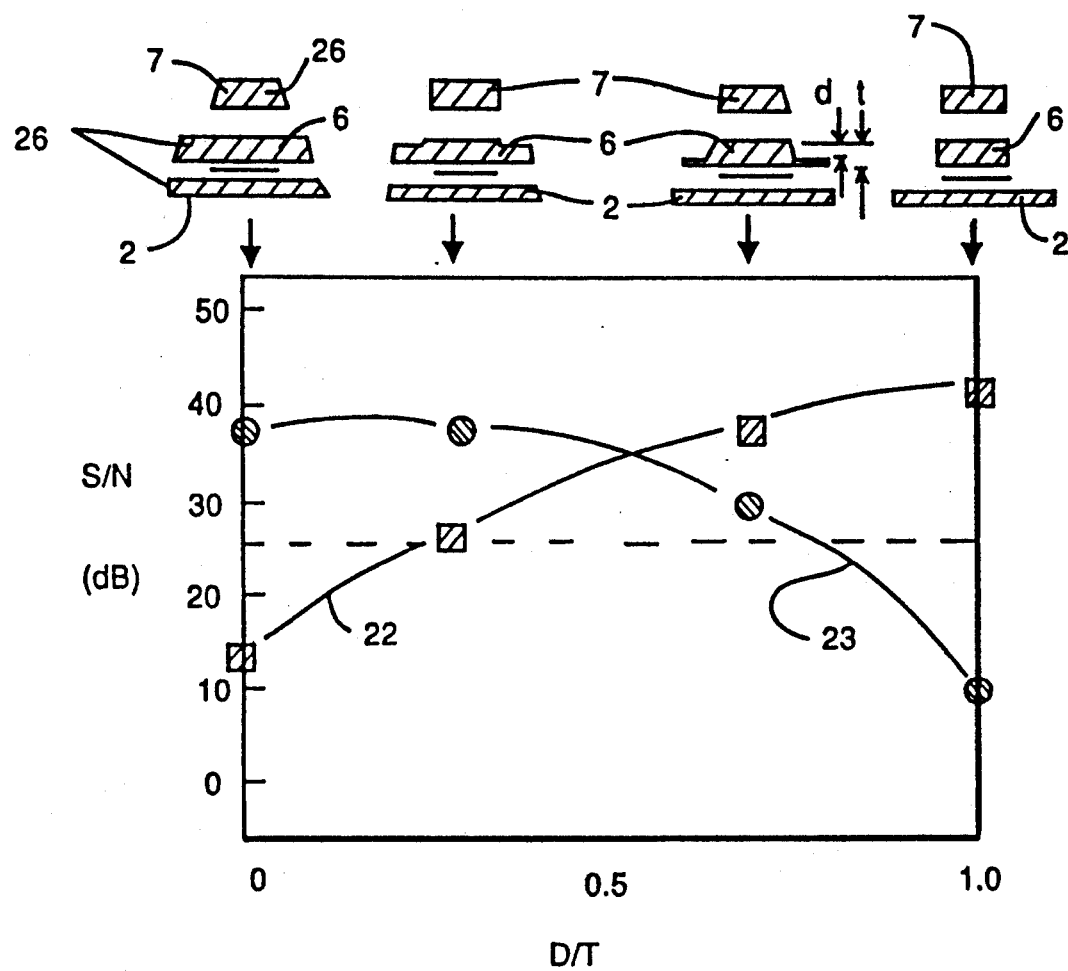
FIG. 2 is a diagram of experimental data.

FIG. 2 shows the off-track overwrite performance curve 22 of the head shown in FIGS. 1(a) and 1(b) and its cross-talk performance curve 23 due to the adjacent tracks. The parameter d/t is the ratio of the thickness d of the step 16 of the lower magnetic pole 6 to the thickness t of the lower magnetic pole. The schematic view of the shape of the poles 6, 7 of the recording head at each of four ratios, as viewed from the surface facing the medium, is illustrated on the diagram. Since the side surfaces of the poles 6 and 7 are tapered during information, the section of each pole is trapezoidal. In the results shown in the diagram, the off-track distance is set to 10% of the track width. The overwrite performance can be improved when the step thickness d increases. This is because the flux at the time of recording concentrates on the recording track width portion with the increase in the step thickness and side recording decreases. The cross-talk performance, also depends on the step thickness d and when the step thickness d becomes greater, the signal to noise ratio S/N drops, which is measured in dB. As d/t becomes greater, the thickness of the shield layer, lower part 24, becomes small and the shield effect drops. When d/t is 1, that is, when the width of the magnetic shield layer 24 is in agreement with the width of the upper magnetic pole 7, the end portion of the magnetoresistive sensor 4 is not shielded so that the S/N drops remarkably. The diagram shows the case where 26 dB is set as the lower limit of the S/N necessary for the operation of the magnetic head. Accordingly, the preferred range of values for the step thickness d, in the case of the 2 μm-thick permalloy in the embodiment is from about 0.6 μm to about 1.4 μm. This range depends on the angle of the taper-like sides 26 of the upper part 25 and lower part 24, in section. In other words, the sharper the taper of the side 26, the greater the decrease of side recording with the result being the improvement in the off-track overwrite performance 22. Furthermore, when the upper magnetic pole 7 is formed by plating, the section side 26 is reversely tapered from that shown, and the side recording can further be reduced. The range described above depends on the magnetic characteristics, e.g., saturated flux density $B_s$, permeability $\eta$ of the magnetic film used for the magnetic pole 6 and its film thickness.

Another embodiment of the present invention will be described with reference to FIGS. 3(a) and (b).

Figure 3A:
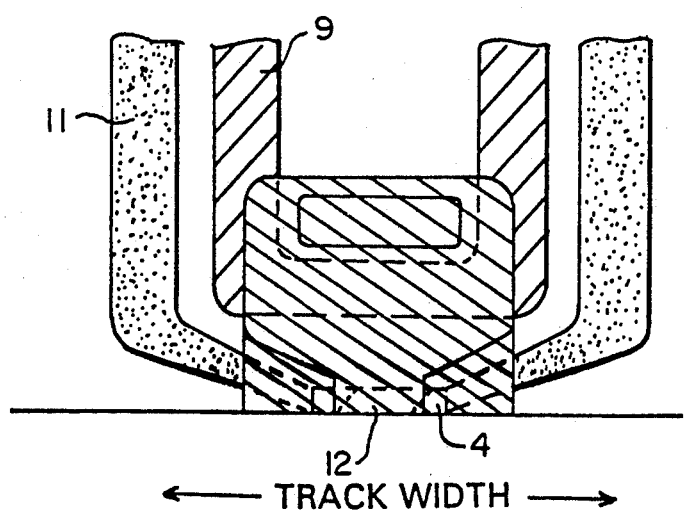
FIGS. 3(a), (b), and (c) are a plan view and end views showing different embodiments.

FIG. 3(a) is a plan view of the magnetic head and 3(b) is an end view as viewed from the surface of a recording medium, to correspond to FIGS. 1(a) and (b). A magnetoresistive sensor 4 is sandwiched between the upper pole 18 and lower pole 13 for recording. The lower magnetic pole 13 for recording functions as a magnetic shield layer and is formed on a substrate 1. Next, an insulating layer 14 is formed and the magnetoresistive sensor 4 is disposed on the insulating layer 14. Next, electrode layers 11 and a conductor layer 9 to function as the coil of the recording head are formed on the insulating layer 14. Afterward an insulating layer 15 is formed on the conductive layer 9 and electrode layer 11, and then a groove 17 corresponding to the recording track width is formed in the insulating layer 15. Subsequently, a magnetic film 18 is laminated as the upper magnetic pole and magnetic shield film. A Co system amorphous alloy having a saturated flux density of 1.3T is used as the magnetic film 18. The thickness of each film is 1.5 μm. The dimension of the lower magnetic pole 13 in the track width direction is 50 μm, the width of the upper magnetic pole 18 is 45 μm and its groove width is 6 μm. Alumina formed by sputtering is used for the insulating layers 14 and 15 of a film thickness 0.4 μm and 0.4 μm between the upper and lower magnetic poles 13, 18 respectively. The magnetoresistive sensor 4 is made of 40 nm-thick permalloy. The barberpole bias method is used as the bias method in the same way as in Embodiment 1. The sensor is 30 μm long and 12 μm high. A 0.2 μm-thick-Al film is used for the electrode layer 11 of the magnetoresistive sensor. The distance between the electrodes in the track width direction, that is, the track width, is 4 μm. The film thickness of the insulating layer 15 must be changed in accordance with the groove depth.

Figure 3B:
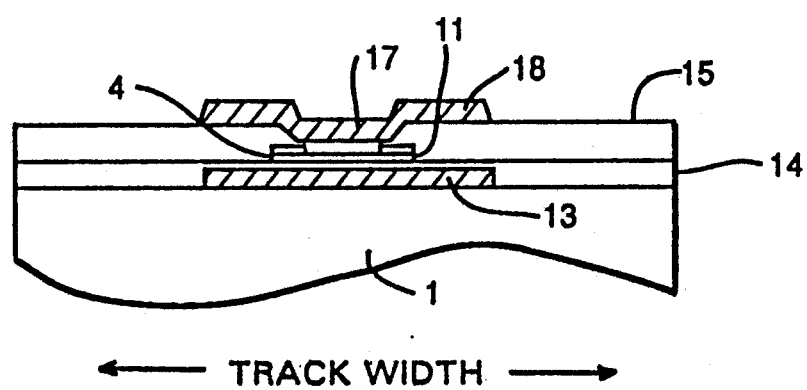
Figure 3C:
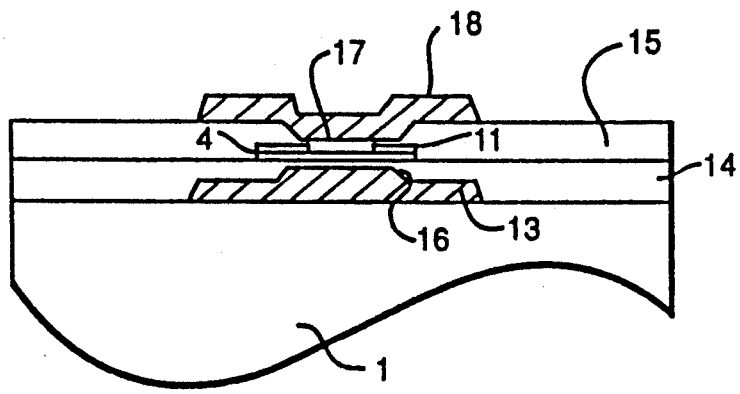

FIG. 3 (c) shows a modification of the embodiment shown in FIGS. 3 (a) and (b), and differs therefrom only in the shape of the magnetic pole piece 13 that also serves as the shield member. In FIG. 3 (c), the magnetic pole piece 13 has a stepped portion 16, the width of which is preferably equal to about the width of the groove piece 17 although it may be of other shapes and dimensions as shown with respect to the similarly shaped piece 6 of FIG. 1 (b).

The off-track overwrite performance of this head and its adjacent track cross-talk performance are evaluated by use of the groove depth as the thickness d of the parameter d/t that is used in FIG. 2. As a result, it was found that a S/N of 26 dB or above can be obtained with the groove depth range of 0.5 μm to 1.0 μm. In this manner, both the off-track overwrite performance and adjacent track cross-talk can be improved by employing the groove of FIGS. 3(a) and (b) as the step in the magnetic shield layer. The magnetic shield layer 13 serving also as the lower magnetic pole in the FIGS. 3(a) and (b) embodiment, could have a step, for example like layer 11 of FIG. 1(b). In this case, too, the effect of the step can be obtained and both the off-track overwrite performance and adjacent track cross-talk can be improved. However, since the magnetoresistive sensor must be made flat, the insulating layer 14 must be made flat by the etch-back method.

The magnetoresistive sensor can use other bias methods. For example, the known dual coupled thin-film self bias, current bias and permanent magnet bias can be employed. Besides the rectangular shape described in the foregoing embodiments, the shape of the sensor may be a picture frame structure having a fine gap.

Though all the foregoing embodiments represent the case where a magnetoresistive sensor having high reproduction efficiency is used as the reproduction head, a conventional inductive head can be used. In this case, off-track overwrite performance and cross-talk between the adjacent tracks can be reduced by making the track width of the recording head great and the track width of the reproduction head small. Accordingly, the head characteristics can be improved by disposing the step on the magnetic pole for both recording and reproduction and bringing the upper and lower dimensions of the step into conformity with the track width, respectively.

Figure 4:
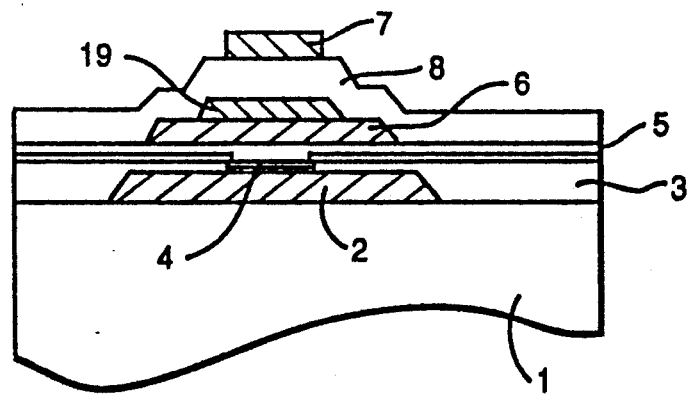
FIGS. 4 and 5 are end views of further embodiments of the invention.

Next, another embodiment wherein the specific permeability and saturated flux density differ between the upper and lower parts of the magnetic film for the combined use will be described. In FIG. 4, a magnetic pole 19 for recording is shown laminated on the magnetoresistive sensor type reproduction head. In the reproduction head, the thin film permalloy magnetoresistive sensor 4 is formed between the permalloy shield layers 2 and 6 and the insulating layers 1, 3 and 5 are formed, all in the same way as in Embodiment 1. Next the lower magnetic pole 19 of the recording head is formed on the upper magnetic shield layer 6. In this instance, the magnetic shield consists of a 0.7 μm-thick permalloy. CoTaZr having a saturated flux density of 1.3 T is used as the magnetic pole 19, and the film thickness is 0.8 μm. Thereafter the coil (not shown) is formed and covered by the insulator layer 8, and then the upper magnetic pole 7 is formed on the insulating layer 8. This pole is made of 1.5 μm-thick CoTaZr. The dimension of each magnetic layer in the track width direction is 100 μm for the lower shield layer 2, 90 μm for the upper shield layer 6, 8 μm for the lower magnetic pole 19 and 6 μm for the upper magnetic pole 7. The film thickness of the insulating layers, and the structure of the magnetoresistive sensor and electrode layer 11 are the same as those of the FIGS. 1(a), (b) head.

In this manner, side recording of the recording magnetic field can be limited by increasing the saturated flux density of the magnetic pole 19 on the recording head side relative to the other layers and the recording performance can be improved.

Figure 5:
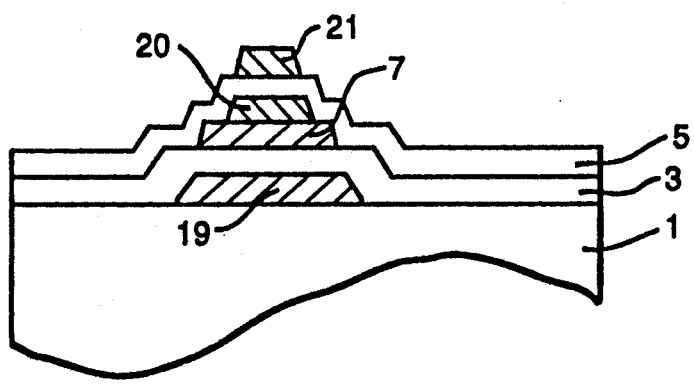

Next, still another embodiment of the invention using an inductive head for both the recording and reproduction heads will be explained with reference to FIG. 5, with other details being the same. First of all as previously described, the lower and upper magnetic poles 19 and 7 for recording are formed on the substrate 1 with the interposition of insulating layer 3. The width of poles 7 and 19, in the direction of the track width at this time is 10 μm and 8 μm, respectively. The film thickness is 3 μm for both poles 7 and 19 and the material used is CoTaZr having a saturated flux density of 1.3 T. Permalloy is laminated on the pole 7 as the magnetic poles 20 and 21 with the interposition of insulating layer 5 for the reproduction head. The lower magnetic pole for reproduction 20 and the upper magnetic pole for reproduction 21 each have a film thickness that is 1 μm. The dimensions of the reproduction head in the track width direction are 5 μm for the lower magnetic film 20 and 4 μm for the upper magnetic pole 21. The specific permeability is 1200 for CoTaZr and 2000 for the permalloy. The film thicknesses of the insulating layers 3 and 5 as the gap layers are 1.5 μm and 0.2 μm, respectively. The number of turns is 8 and 24 turns for the recording head and for the reproduction head, respectively.

As described above, the side recording of the recording magnetic field can be restricted by increasing the saturated flux density of the magnetic pole on the recording head side and increasing the permeability of the magnetic pole on the reproduction head side and the recording characteristics can be improved. Since the flux at the time of reproduction concentrates on the magnetic poles for reproduction, reproduction can be effected efficiently.

Since the present invention can restrict side recording occurring at the end portion of the magnetic pole of the recording head, it can improve the off-track overwrite performance. Since the magnetic shield layer can cover the end portions of the magnetoresistive sensor, cross-talk between the tracks can be reduced.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A magnetic head having a surface for facing a recording medium having a plurality of tracks each having a width, which surface is used herein for dimensioning reference and defines a track width direction, comprising:
   a recording head;
   a reproduction head spaced from and integrated with said recording head;
   a magnetic layer means, including a magnetic pole and a magnetic shield layer, for commonly functioning as a magnetic pole and magnetic shield layer of both of said heads;
   said magnetic layer means having a first part and a second part as referenced in a direction perpendicular to the track width direction and substantially in a plane parallel to that of the track width, on the reproduction head and recording head portions, respectively, of the magnetic head; and
   said first and second parts having respectively different widths in the track width direction.

2. An integrated magnetic head according to claim 1, wherein said reproduction head is composed of a magnetoresistive sensor.

3. An integrated magnetic head according to claim 1, wherein said magnetic layer means has a step between said first and second parts, and a width of said magnetic pole and a width of said magnetic shield layer are respectively defined by the widths of said first and second parts in the track width direction.

4. An integrated magnetic head according to claim 3, wherein the ratio of a thickness of said first part to a thickness of said magnetic layer means is from 0.3 to 0.7, said first part thickness and said magnetic layer means thickness both being measured in a direction perpendicular to the track width direction.

5. An integrated magnetic head according to claim 1, wherein magnetic characteristics of said magnetic layer means are different between said first part and said second part, and a specific permeability of said first part is greater than that of said second part.

6. An integrated magnetic head according to claim 1, wherein a saturated magnetic flux density of said first part is different from that of said second part.

7. An integrated magnetic head according to claim 1, wherein said first and second parts comprise a single homogeneous thin film.

8. An integrated magnetic head according to claim 1, wherein said first and second parts are separate contacting films of different material.

9. An integrated magnetic head according to claim 2, wherein the width of said second part is substantially greater than, and the width of said first part substantially less than, both a width of said magnetoresistive sensor and the track width sufficiently to suppress noise, that occurs at portions other than within the track width of a track under recording/reproduction, from interfering with the operation of the integrated recording and reproduction heads.

10. An integrated magnetic head according to claim 1, including a recording head pole having a width and a reproduction head pole having a width, with said magnetic layer means being located therebetween; wherein the width of said first part is substantially equal to the width of said reproduction head pole, and the width of said second part is substantially equal to the width of said recording head pole.

11. An integrated magnetic head according to claim 10, wherein said reproduction head is composed of a magnetoresistive sensor, layered between and having a width between said second part and said recording head pole.

12. An integrated magnetic head according to claim 2, wherein said magnetic layer means has a step between said first and second parts, and a width of said magnetic pole and a width of said magnetic shield layer are respectively defined by the widths of said first and second parts in the track width direction.

13. An integrated magnetic head according to claim 12, wherein the ratio of a thickness of said first part to a thickness of said magnetic layer means is from 0.3 to 0.7, said first part thickness and said magnetic layer means thickness both being measured in a direction perpendicular to the track width direction.

14. An integrated magnetic head according to claim 13, wherein said first and second parts comprise a single homogeneous thin film.

15. An integrated magnetic head according to claim 13, wherein said first and second parts are separate contacting films of different material.

16. An integrated magnetic head according to claim 13, wherein the width of said second part is substantially greater than, and the width of said first part substantially less than, both a width of said magnetoresistive sensor and the track width sufficiently to suppress noise, that occurs at portions other than within the track width of a track under recording/reproduction, from interfering with the operation of the integrated recording a reproduction heads.

17. An integrated magnetic head according to claim 16, including a recording head pole having a width and a reproduction head pole having a width, with said magnetic layer means being located therebetween; wherein the width of said first part is substantially equal to the width of said reproduction head pole, and the width of said second part is substantially equal to the width of said recording head pole.

18. An integrated magnetic head according to claim 12, wherein the width of said second part is substantially greater than, and the width of said first part substantially less than, both a width of said magnetoresistive sensor and the track width sufficiently to suppress noise, that occurs at portions other than within the track width of a track under recording/reproduction, from interfering with the operation of the integrated recording and reproduction heads.

19. An integrated magnetic head according to claim 18, including a recording head pole having a width and a reproduction head pole having a width, with said magnetic layer means being located therebetween; wherein the width of said first part is substantially equal to that of said reproduction head pole, and the width of said second part is substantially equal to that of said recording head pole.

20. An integrated magnetic head according to claim 1, wherein a width of said magnetic pole and a width of said magnetic shield layer are respectively defined by the widths of said first and second parts in the track width direction.

21. An integrated magnetic head according to claim 20, wherein the ratio of a thickness of said first part to a thickness of said magnetic layer means is from 0.3 to 0.7, said first part thickness and said magnetic layer means thickness both being measured in a direction perpendicular to the track width direction.

22. An integrated magnetic head according to claim 20, wherein magnetic characteristics of said magnetic layer means are different between said first part and said second part, and a specific permeability of said first part is greater than that of said second part.

23. An integrated magnetic head according to claim 20, wherein a saturated magnetic flux density of said first part is different from that of said second part.

24. An integrated magnetic head according to claim 20, wherein said first and second parts comprise a single homogeneous, thin film.

25. An integrated magnetic head according to claim 24, wherein said thin film is of substantially uniform thickness having a shape defined by a central horizontal portion, two end horizontal portions vertically spaced from said central horizontal portion and horizontally spaced outwardly from respective ends of said central horizontal portion, and two connecting portions between said central horizontal portion and respective end horizontal portions.

26. An integrated magnetic head according to claim 20, wherein said first and second parts are separate contacting films of different material.

27. An integrated magnetic head according to claim 20, wherein the width of said second part is substantially greater than, and the width of said first part substantially less than, the width of the track width sufficiently to suppress noise, that occurs at portions other than within the track width of a track under recording/reproduction, from interfering with the operation of the integrated recording and reproduction heads.

28. An integrated magnetic head according to claim 20, including a recording head pole having a width and a reproduction head pole having a width, with said magnetic layer means being located therebetween; wherein the width of said first part is substantially equal to the width of said reproduction head pole, and the width of said second part is substantially equal to the width of said recording head pole.

29. An integrated magnetic head according to claim 27, wherein said reproduction head is composed of a magnetoresistive sensor, layered between and having a width between said second part and said recording head pole.

30. An integrated magnetic head according to claim 29, wherein the width of said second part is substantially greater than, and the width of said first part substantially less than, the width of the track width sufficiently to suppress noise, that occurs at portions other than within the track width of a track under recording- /reproduction, from interfering with the operation of the integrated recording and reproduction heads.

31. An integrated magnetic head according to claim 28, wherein the width of said second part is substantially greater than, and the width of said first part substantially less than, the width of the track width sufficiently to suppress noise, that occurs at portions other than within the track width of a track under recording-/reproduction, from interfering with the operation of the integrated recording and reproduction heads.

32. A magnetic recording and reproducing device, including a magnetic head having a surface for facing a recording medium surface, said magnetic head surface being used herein for dimensioning reference and defining a track width direction, comprising:

a recording head having one pair of magnetic layer means;

a reproduction head between said one pair of magnetic layer means;

wherein at least one of said pair of magnetic layer means has a first part and a second part, as referenced in a direction perpendicular to the track width direction and substantially in a plane parallel to the recording medium surface, that respectively function as a magnetic pole of said recording head and as a magnetic shield layer; and said first part and second part of said magnetic layer means have respectively different widths as measured in the track width direction.

* * * * *